(12) United States Patent  (10) Patent No.: US 7,876,843 B2
Bienas et al.  (45) Date of Patent: Jan. 25, 2011

(54) METHOD FOR DATA TRANSMISSION AND COMMUNICATION SYSTEM

(75) Inventors: Maik Bienas, Braunschweig (DE); Martin Hans, Bad Salzdetfurth (DE); Michael Eckert, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 680 days.

(21) Appl. No.: 11/862,612

(22) Filed: Sep. 27, 2007

(65) Prior Publication Data

US 2009/0086791 A1   Apr. 2, 2009

(51) Int. Cl.
*H04K 1/10* (2006.01)
*H04L 27/28* (2006.01)

(52) U.S. Cl. .................. 375/260; 375/132; 375/133

(58) Field of Classification Search ......... 375/132–133, 375/260
See application file for complete search history.

(56) References Cited

U.S. PATENT DOCUMENTS

2006/0176850 A1* 8/2006 Gan et al. .................. 370/329

FOREIGN PATENT DOCUMENTS

| CN | 1790962 A | 6/2006 |
|---|---|---|
| JP | 2004-274220 A | 9/2004 |
| JP | 2004-289446 A | 10/2004 |
| WO | WO-2004/077777 A1 | 9/2004 |

OTHER PUBLICATIONS

3GPP TS 36.300 V8.1.0 (Jun. 2007); *Technical Specification*; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

* cited by examiner

*Primary Examiner*—Curtis B Odom
(74) *Attorney, Agent, or Firm*—Dickstein Shapiro LLP

(57) ABSTRACT

In one embodiment, a method for data transmission is provided comprising determining a set of frequency bands available for data transmission from a plurality of frequency bands; determining whether there is a frequency band of the plurality of frequency bands that lies between two frequency bands of the set of frequency bands and is not in the set of frequency bands; selecting, in case that there is a frequency band of the plurality of frequency bands that lies between two frequency bands of the set of frequency bands and is not in the set of frequency bands, another set of frequency bands from the plurality of frequency bands such that there is no frequency band of the plurality of frequency bands that lies between two frequency bands of the other set and is not in the other set; and transmitting the data using the other set of frequency bands.

18 Claims, 7 Drawing Sheets

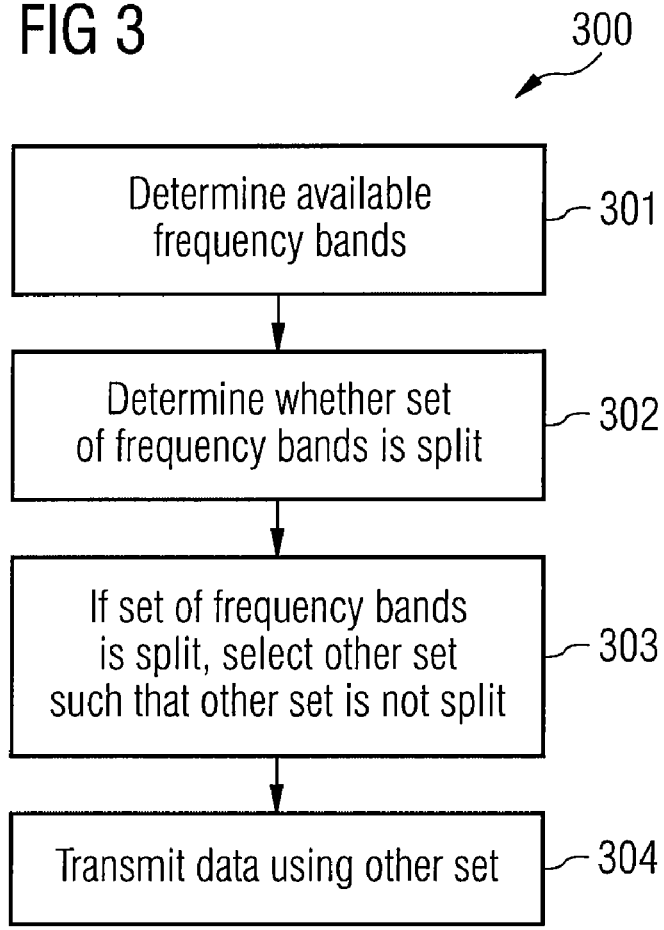
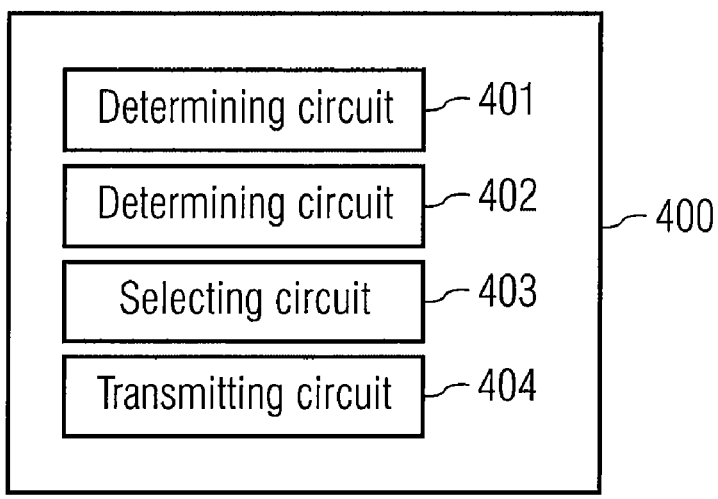

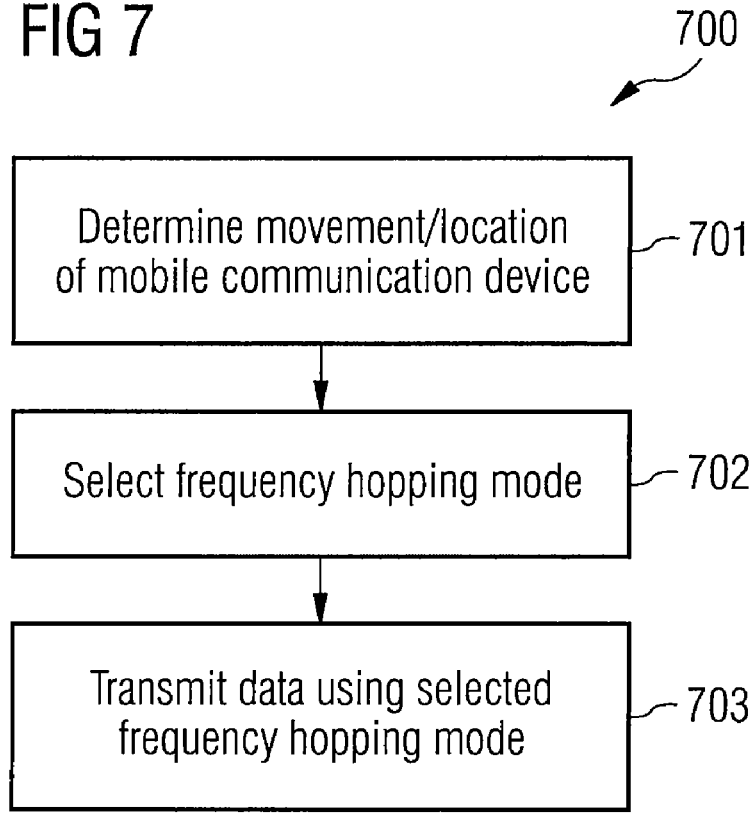
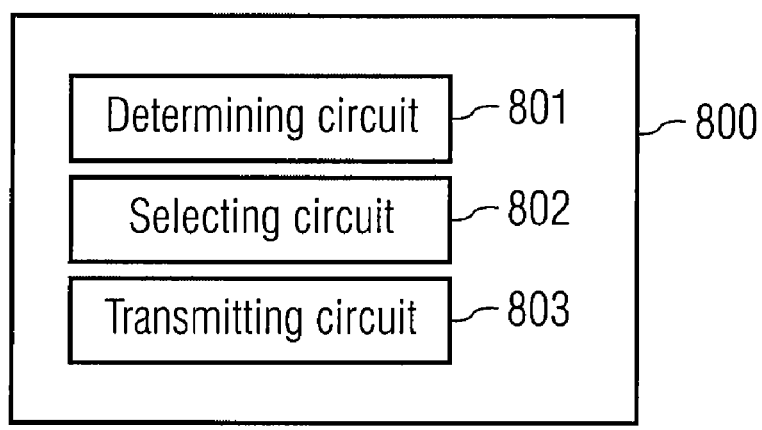

METHOD FOR DATA TRANSMISSION AND COMMUNICATION SYSTEM

TECHNICAL FIELD

Embodiments of the invention relate generally to methods for data transmission and communication systems.

BACKGROUND

In a communication system where available communication resources, such as radio resources, can be used by a plurality of communication devices, communication resources may be allocated to the communication devices for dedicated use. Depending on the type of communication resources and depending on the communication technology used, there may exist a large number of possibilities to allocate communication resources, which may not all be equally suited for the current situation in the communication system. Efficient ways for communication resource allocation are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a flow diagram according to the embodiment of the invention;

FIG. 4 shows a communication system according to an embodiment of the invention;

FIG. 7 shows a flow diagram according to the embodiment of the invention;

FIG. 8 shows a communication system according to an embodiment of the invention;

DESCRIPTION

Figure 1:
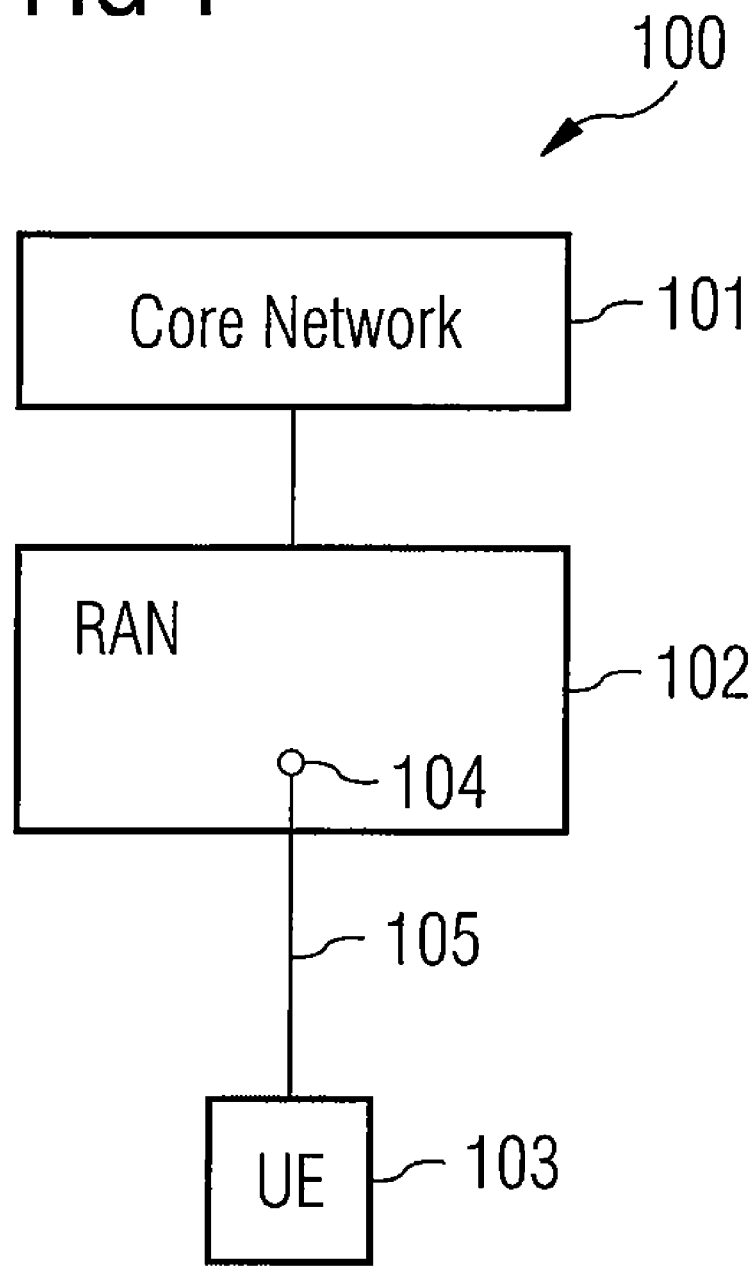
FIG. 1 shows a mobile communication system according to an embodiment of the invention.

FIG. 1 shows a mobile communication system 100 according to an embodiment of the invention.

The mobile communication system 100 includes a core network 101, a radio access network (RAN) 102 and a mobile communication device 103. The mobile communication device 103 is located in a radio cell of the mobile communication system 100 operated by a base station 104 of the radio access network 102. The mobile communication system 100 may include more than one mobile communication device 103 and more than one base station 104. Only one is shown for simplicity.

The mobile communication device 103 may have a communication connection over the air interface 105 between the mobile communication device 103 and the radio access network 102. This means that the mobile communication device 103 may have a radio communication connection to the base station 104 via the air interface 105. Via the radio access network 102, which is coupled to the core network 101, the mobile communication device 103 may communicate with the core network 101 and may for example use services like conferencing services provided by the core network 101.

The mobile communication system 100 is for example a cellular mobile communication system according to the GSM (Global System for Mobile Communications) standard, the FOMA (Freedom of Mobile Access) standard, the UMTS (Universal Mobile Telecommunications System) standard or the CDMA 2000 (CDMA: Code Division Multiple Access) standard.

Currently, the UMTS standard in mobile communication systems is revised in the standardization forum 3GPP ($3^{rd}$ Generation Partnership Project). Among others, the air interface 105 according to UMTS is newly designed. The newly designed radio access network 102 according to this revision is called E-UTRAN (Evolved UMTS Terrestrial Radio Access Network). The new developments according to this revision are referred to by the term LTE (Long Term Evolution).

In the following, it is assumed that the mobile communication system 100 is a UMTS mobile communication system according to LTE and some details of its operation are given. For the downlink, i.e. for the data transmission from the base station 104 (which is called eNodeB according to LTE) to the mobile communication device 103 (which is called UE for user equipment according to UMTS), OFDM (Orthogonal Frequency Division Multiplexing) is used. OFDM is a data transmission method in which a multiplicity of narrow frequency bands which are denoted as sub-carriers are used for data transmission. This allows very efficient use of the (overall) frequency band which is available for the data transmission. In principle, data to be transmitted can be associated with the sub-carriers arbitrarily; this means that anyone of the sub-carriers or any group of the sub-carriers can be used to transmit data to be transmitted. This for example allows selection of the frequency bands for data transmission which, due to multi-path propagation, have good transmission properties. The contrary effect that signals transmitted using certain frequency bands are attenuated partially or totally due to bad transmission properties is called frequency selective fading.

Due to the fact that the sub-carriers correspond to relatively narrow frequency bands the equalization of the transmitted signals in the receiver is very easy. However, the requirements of OFDM for the sender are relatively high. Therefore, OFDM is not very well suited as technology for sending data from mobile devices.

For the uplink, i.e. for data transmission from the mobile communication device 103 to the base station 104, a data transmission method is used which is slightly modified with respect to OFDM and denoted as SC-FDMA (Single Carrier Frequency Division Multiple Access). This data transmission method has lower requirements on the sender compared to OFDM and is therefore better suited as sending method for mobile devices as OFDM. A side effect of the modification of OFDM according to SC-FDMA is that data to be sent can not be associated arbitrarily with sub-carriers but it is necessary that all sub-carriers used for the transmission of data are adjacent, i.e. from a continuous frequency band.

For the radio access network according to LTE, i.e. for the E-UTRAN, it is contemplated that in neighboring radio cells data may be sent at the same time using the same frequency band. If the mobile communication device 103 is located at the border of the radio cell operated by the base station 104 and therefore is located in a region where signals sent by it can be received by other base stations operating neighboring radio cells may cause problems by disturbing the signals transmitted in the neighboring radio cells. These disturbances are referred to as inter cell interference.

One possibility for allocating sub-carriers to the mobile communication device 103 is to allocate the sub-carriers semi-statically to the mobile communication device 103. This means that the mobile communication device 103 can use the allocated sub-carriers, e.g. for uplink data transmission, for a predefined time period, which includes a plurality of time slots. During this time period the sub-carriers allocated to the mobile communication device 103 do not change. In other words, the sub-carriers allocated to the mobile communication device 103 are fixed for the duration of the semi-statical allocation. For example, in case of semi-statical allocation, the mobile communication device 103 is not instructed to periodically change the sub-carriers used by it.

A problem may arise when the allocated sub-carriers have, for example temporarily, bad transmission characteristics, i.e. are affected by frequency selective fading, such that for example an error-free data transmission in the uplink can not be carried out by the mobile communication device 103. Contrariwise, it is also possible that sub-carriers are allocated to the mobile communication device 103 which are currently not affected by frequency selective fading and have currently very good transmission characteristics and thus, the mobile communication device 103 benefits from very good transmission properties for its uplink data transmission.

Generally, the semi-statical sub-carrier allocation has the property that if the mobile communication device 103 is located at the border of a radio cell it strongly generates inter cell interference and disturbs data transmission of mobile communication terminals located in radio cells neighboring the radio cell in which the mobile communication device 103 is located.

Another possibility for sub-carrier allocation is to periodically change the sub-carriers allocated to the mobile communication device 103 according to a certain pattern or rule. This method is denoted as frequency hopping and is for example applied according to GSM mobile communication systems and according to the Bluetooth radio transmission technology. By frequency hopping it can be achieved that the disturbances due to a frequency selective fading are statistically distributed among all mobile communication devices in the radio cell. This generally leads to a higher overall data rate in the radio cell due to the fact that error correction mechanisms can be used effectively. Furthermore, the disturbances in neighboring radio cells by inter cell interference can be minimized. Due to the constant change of sub-carriers used by the mobile communication device 103 it happens less often that the mobile communication device 103, if it is located at the border of the radio cell, uses a sub-carrier for data transmission that is at the same time used by a nearby mobile communication device in a neighboring radio cell.

Frequency hopping is not well suited if the mobile communication device 103 is moving at high speed since there is not enough time for the equalization in the receiver to determine the correct equalization coefficients before the sub-carrier used for the data transmission changes.

Figure 2:
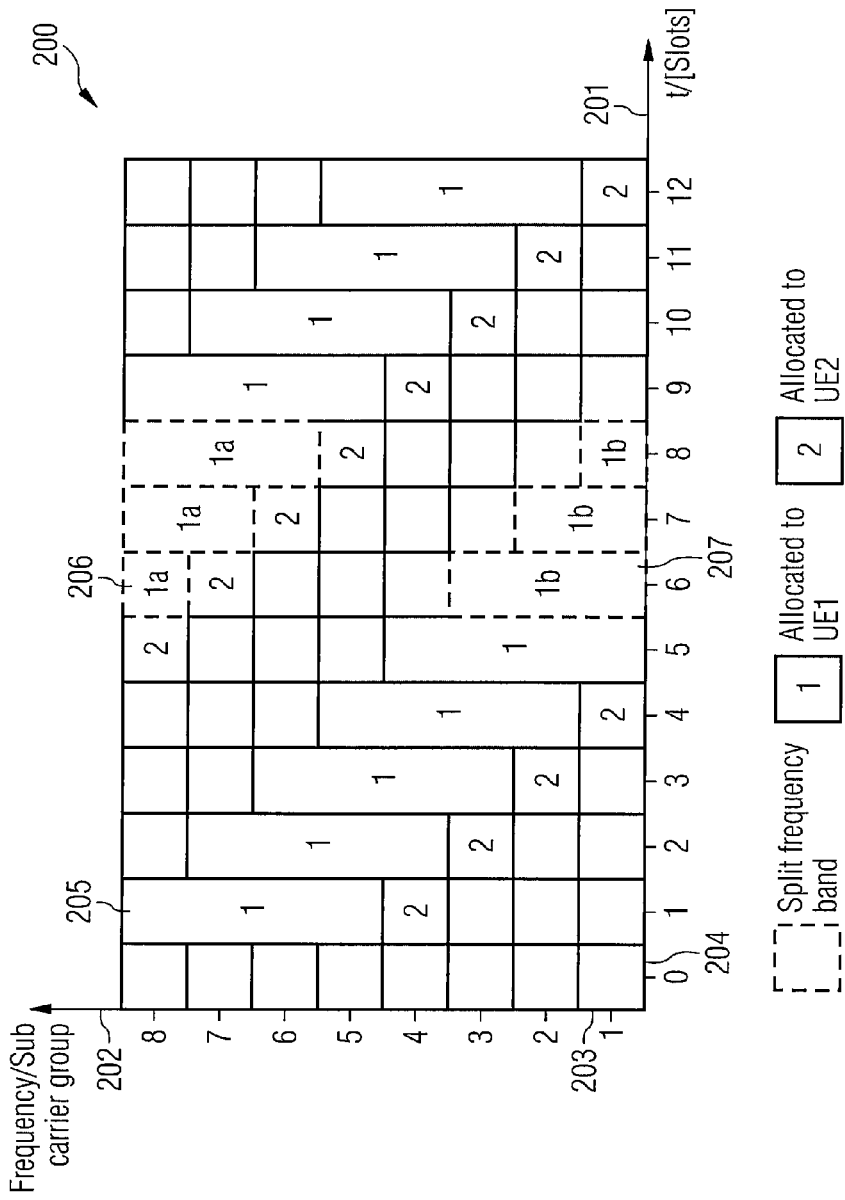
FIG. 2 shows a time frequency diagram.

A further problem may arise when a frequency hopping is used for uplink data transmission according to LTE since the frequency hopping may lead to the situation that the sub-carriers allocated to the mobile communication device 103 are not adjacent but the frequency band corresponding to the sub-carriers allocated to the mobile communication device 103 is split. However, as mentioned above, in uplink data transmission according to LTE this frequency band splitting is not allowed. FIG. 2 illustrates the situation.

FIG. 2 shows a time frequency diagram 200.

Time is illustrated into the right direction along a time axis 201 and frequency is illustrated into the upwards direction along a frequency axis 202. The frequency range illustrated along the frequency axis 202 is divided into plurality of sub-carriers 203. The center frequencies of the sub-carriers 203 are numbered by 1 to 8 along the frequency axis 202. This numbering is also used for the corresponding sub-carriers 203.

In another embodiment, the frequency range is divided into sub-carrier sets 203 including a plurality of sub-carriers. However, for simplicity, it is assumed in the following that there are 8 sub-carriers 203 (i.e. each sub-carrier set only includes one sub-carrier with center frequencies numbered 1 to 8.

The time period illustrated along the time axis 201 is divided into time slots 204 numbered from 0 to 12 along the time axis 201. A time slot for example has a length of 0.5 ms and, for example, 20 time slots form a radio frame.

A sub-carrier 203 may be allocated to a mobile communication device 103. The mobile communication device 103 to which a sub-carrier 203 is allocated may change from time slot 204 to time slot 204. In this example, it is assumed that there are two mobile communication devices 103 denoted as UE1 and UE2. One or more sub-carriers allocated in a time slot to a mobile communication device 103 form, in the illustration of FIG. 2, a box 205 which is labelled with 1 if the sub-carrier or sub-carriers is/are allocated to UE1 in the time slot or by 2 if the sub-carrier or sub-carriers is/are allocated to UE2 in the time slot.

In this example, the sub-carrier allocation is the sub-carrier allocation for uplink data transmission of the mobile communication devices UE1 and UE2. In this example, a frequency hopping method for uplink data transmission is used, according to which from time slot 204 to time slot 204 the numbers of the sub-carriers allocated to a mobile communication device 103 decreases by 1. For example, in time slot 1 sub-carrier 4 is allocated to UE2 and in time slot 2 sub-carrier 3 is allocated to UE2. When the end of the frequency band formed by sub-carriers 1 to 8 is reached the allocation continued at the other end of the frequency band, in this case the upper end of the frequency band. For example, in time slot 4 sub-carrier 1 is allocated to UE 2 and, since sub-carrier 1 is the sub-carrier with the lowest number in the frequency band, in time slot 5 sub-carrier 8 is allocated to UE2. In this example, four sub-carriers are allocated to UE1 simultaneously in one same time slot. According to the rule that the allocation scheme continues at the other end of the frequency band when one end has been reached, the situation arises, e.g. in time slot 6, that the sub-carrier group allocated to UE1 is split into a first part 206 labelled 1a and a second part labelled 1b.

According to LTE uplink data transmission the first part and the second part cannot both be used by the mobile communication device 103 since, as mentioned above, the sub-carriers allocated to a mobile communication device 103 to be used for uplink data transmission according to LTE have to form a continuous frequency band.

For allowing the use of SC-FDMA for uplink data transmission according to LTE even in the case of the usage of frequency hopping and an eventual frequency band splitting the mobile communication device 103, in one embodiment, carries out a method as illustrated in FIG. 3.

FIG. 3 shows a flow diagram 300 according to the embodiment of the invention.

The flow diagram 300 illustrates a method for data transmission which is for example carried out by the mobile communication device 103.

In 301, a set of frequency bands from a plurality of frequency bands is determined which is available for data transmission. For example, the set of frequency bands are a set of sub-carriers which would be allocated to the mobile communication device 103 according to a frequency hopping sequence.

In 302, it is determined whether there is a frequency band of the plurality of frequency bands that lies between two frequency bands of the set of frequency bands and is not in the set of frequency bands. This means, for example, that it is determined whether the sub-carriers are all adjacent or form one or more sub-carrier groups that are not adjacent, i.e. it is determined whether there is a frequency splitting situation.

In 303, in case that there is a frequency band of the plurality of frequency bands that lies between two frequency bands of the set of frequency bands and is not in the set of frequency bands, another set of frequency bands is selected from the plurality of frequency bands such that there is no frequency band of the plurality of frequency bands that lies between two frequency bands of the other set and is not in the other set. Illustratively, if two or more groups of sub-carriers that are not adjacent would be allocated to the mobile communication device 103, for example, one of the groups is selected or another set of frequency bands is selected which is not split into two or more groups.

In 304, the data is transmitted using the selected other set of frequency bands.

The other set of frequency bands is for example a subset of the set of frequency bands. In one embodiment, the other set of frequency bands is the subset of the set of frequency bands for which there is no frequency band of the plurality of frequency bands that lies between two frequency bands of the subset and is not in the subset which corresponds to the largest frequency range among the subsets of the sets having this property. In other words, the other set for example corresponds to the largest contiguous subband, i.e. to the broadest subband in terms of frequency range, which can be formed of frequency bands of the set of frequency bands.

In one embodiment, if there are a plurality of subsets of the set of frequency bands for which there is no frequency band of the plurality of frequency bands that lies between two frequency bands of the subset and is not in the subset which are larger than all other subsets of the set of frequency bands for which this is the case, the subset of the plurality of subsets is selected which among the plurality of subsets includes the frequency bands corresponding to the lowest frequencies.

The method may further include generating a message specifying the other set and receiving the message. The message is for example generated by a communication network of a communication system and is received by communication terminal of the communication system and the data is transmitted using the other set of frequency bands by the communication terminal. The data is for example transmitted by the communication terminal to the communication network.

The set of frequency bands available for data transmission is for example the set of frequency bands that is to be allocated for data transmission according to an allocation scheme, e.g. according to a frequency hopping scheme.

A communication system according to one embodiment of the invention for carrying out the method described with reference to FIG. 3 is illustrated in FIG. 4.

FIG. 4 shows a communication system 400 according to an embodiment of the invention.

The communication system 400 includes a first determining circuit 401 configured to determine a set of frequency bands available for data transmissions from a plurality of frequency bands.

Further, the communication system 400 includes a second determining circuit 402 configured to determine whether there is a frequency band of the plurality of frequency bands that lies between two frequency bands of the set of frequency bands and is not in the set of frequency bands.

A selecting circuit 403 of the communication system 400 selects, in case that there is a frequency band of the plurality of frequency bands that lies between two frequency bands of the set of frequency bands and is not in the set of frequency bands, another set of frequency bands from the plurality of frequency bands such that there is no frequency band of the plurality of frequency bands that lies between two frequency bands of the other set and is not in the other set.

The communication system 400 further includes a transmitting circuit 404 which is configured to transmit the data using the other set of frequency bands selected by the selecting circuit 403.

The communication system for example includes a communication network and a communication device and the data is transmitted between the communication device and the communication network.

In one embodiment, the first determining circuit, the second determining circuit the selecting circuit and the transmitting circuit are part of the communication device. The selecting unit for example selects as other set of frequency bands the subset of the set of frequency bands for which there is no frequency band of the plurality of frequency bands that lies between two frequency bands of the subset and is not in the subset which corresponds to the largest frequency range among all subsets of the set with this property.

In another embodiment, the first determining circuit, the second determining circuit and the selecting circuit are part of the communication network and the transmitting circuit is part of the communication device. The communication network for example further includes a message generating circuit configured to generate a message specifying the other set and the communication device further includes a receiving unit configured to receive the message.

The set of frequency bands available for data transmission is for example the set of frequency bands that is to be allocated for data transmission according to an allocation scheme, e.g. a frequency hopping scheme.

For example, the second determining circuit 402 and the selecting circuit 404 are part of a radio access network and it is signaled to a communication device of the communication system 400 which other set was selected and is to be used for data transmission by the transmitting circuit 404 which is part of the communication device.

A circuit can be a hardware circuit, e.g. an integrated circuit, designed for the respective functionality or also a programmable unit, such as a processor, programmed for the respective functionality. A processor may be for example a RISC (reduced instruction set computer) processor or a CISC (complex instruction set computer).

An example for the application of the method illustrated in FIG. 3 and for example carried out by the mobile communication device 103 is explained in the following with reference to FIGS. 5 and 6.

Figure 5:
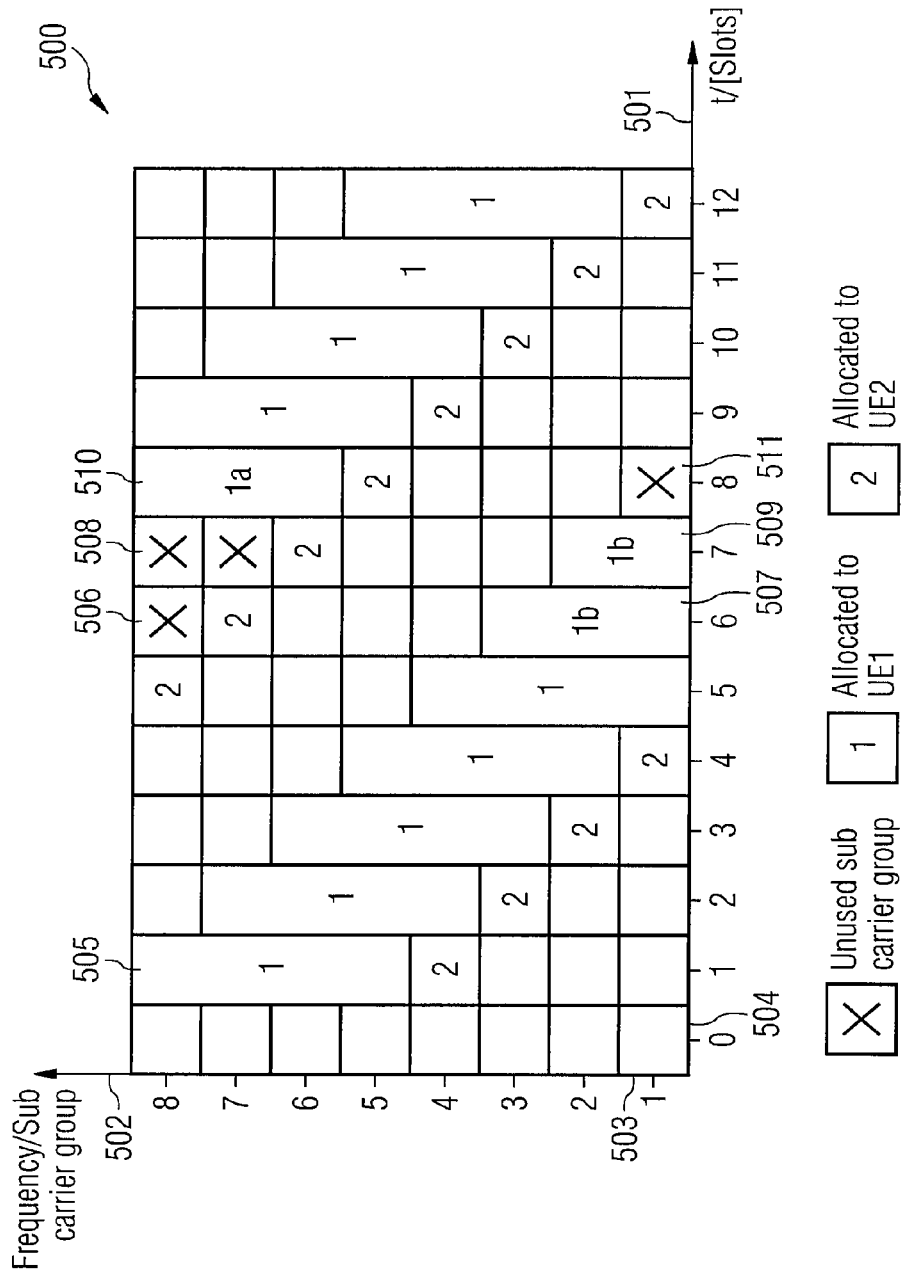
FIG. 5 shows a time frequency diagram according to an embodiment of the invention.

FIG. 5 shows a time frequency diagram 500 according to an embodiment of the invention.

Similarly to FIG. 2, time is illustrated into the right direction along a time axis 501 and frequency is illustrated into the upwards direction along a frequency axis 502. The frequency range illustrated along the frequency axis 502 is divided into plurality of sub-carriers 503. The center frequencies of the sub-carriers 503 are numbered by 1 to 8 along the frequency axis 502.

The time period illustrated along the time axis 501 is divided into time slots 504 numbered from 0 to 12 along the time axis 501. In this example, it is assumed that there are two mobile communication devices 103 denoted as UE1 and UE2. One or more sub-carriers allocated in a time slot to a mobile communication device 103 form a box 505 which is labelled with 1 if the sub-carrier or sub-carriers is/are allocated to UE1 in the time slot or by 2 if the sub-carrier or subcarriers is/are allocated to UE2 in the time slot. The sub-carrier allocation is the sub-carrier allocation for uplink data transmission of the mobile communication devices UE1 and UE2.

In this example, the pattern for frequency hopping is as it was explained with reference to FIG. 2, i.e. the numbers of sub-carriers allocated to UE 1 and UE2, respectively, decrease by one from time slot to time slot.

As in the example described with reference to FIG. 2, the situation occurs that the group of sub-carriers allocated to UE1 is split into two parts. For example, in time slot 6, the group of sub-carriers allocated to UE1 is split into a first part (first sub-carrier group) 506 and a second part (second sub-carrier group) 507. In this example, it is assumed that the mobile communication device denoted by UE1 carries out the method described with reference to FIG. 3.

Consequently, the mobile communication device UE1 determines that the sub-carriers allocated to it form two groups 506, 507 since there is a sub-carrier, for example the sub-carrier number 6, of the sub-carriers 503 which lies between two sub-carriers of the sub-carriers allocated to the mobile communication device UE1, for example between the sub-carrier number 8 and the sub-carrier number 3, and which is not itself allocated to the mobile communication device UE1. Therefore, the mobile communication device UE1 selects one of the groups 506, 507 for a data transmission.

In this example, the larger sub-carrier group, in this case the second sub-carrier group 507 is selected for data transmission and the first sub-carrier group 506, in this case the smaller sub-carrier group, is not used for data transmission. In the situation of time slot number 7, where the sub-carriers allocated to UE1 are divided into a third sub-carrier group 508 and fourth sub-carrier group 509 which are of equal size, the sub-carrier group corresponding to higher frequencies or the one corresponding to lower frequencies is chosen. In this example, the fourth sub-carrier group 509, i.e. the one corresponding to lower frequencies, is selected for data transmission.

In the situation of time slot 8, where the sub-carriers allocated to UE1 are divided into a fifth sub-carrier group 510 and the sixth sub-carrier group 511, the fifth sub-carrier group 510 is selected since it is larger than the sixth sub-carrier group 511. The frequency hopping sequence in which the numbers of the allocated sub-carriers decrease from one time slot to the next is chosen for illustration purposes only. The method described with reference to FIG. 3 can also be applied in scenarios where more complex frequency hopping patterns are used.

Another example is described in the following with reference to FIG. 6.

Figure 6:
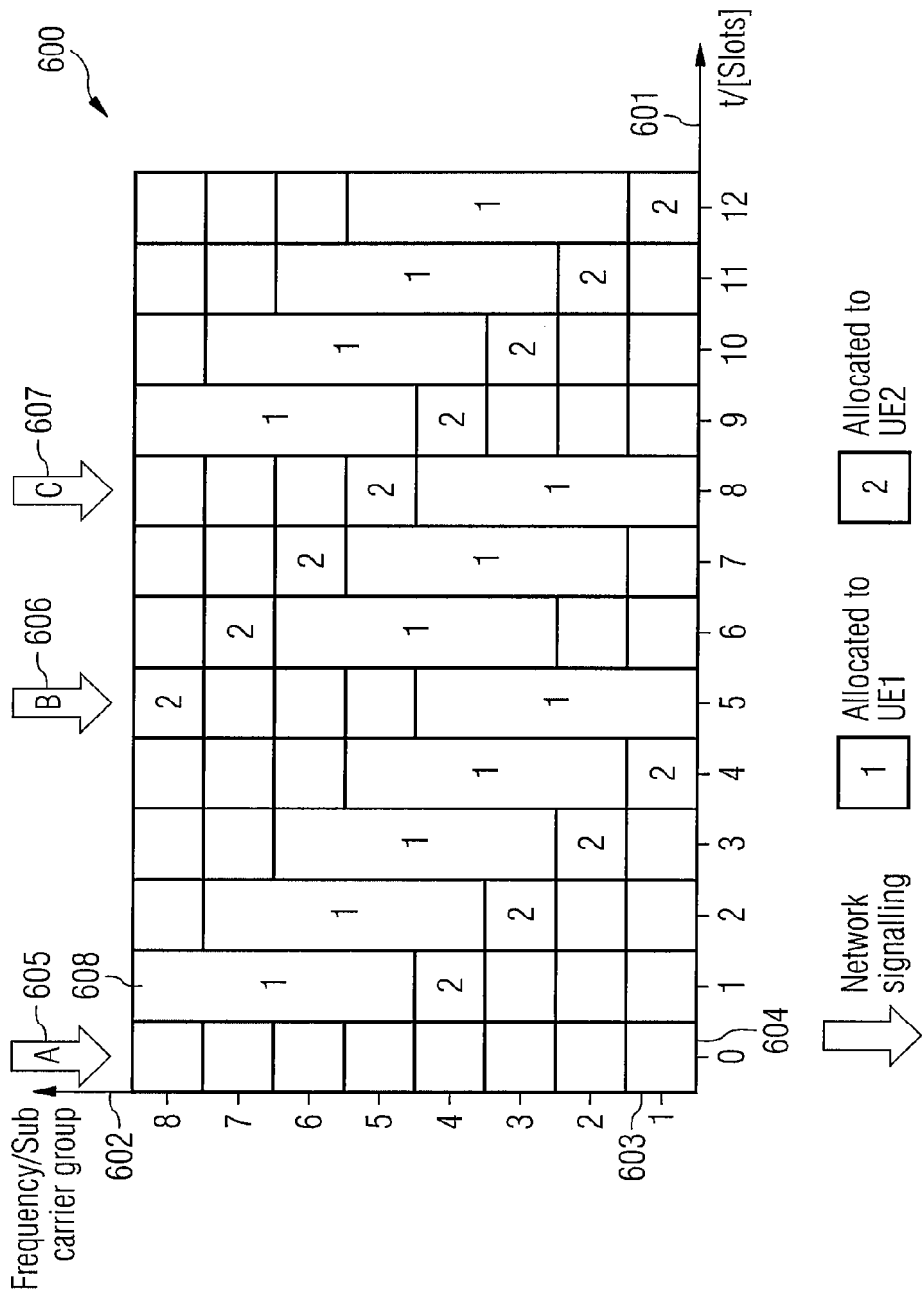
FIG. 6 shows a time frequency diagram according to an embodiment of the invention.

FIG. 6 shows a time frequency diagram 600 according to an embodiment of the invention.

Similarly to FIG. 5, time is illustrated into the right direction along a time axis 601 and frequency is illustrated into the upwards direction along a frequency axis 602. The frequency range illustrated along the frequency axis 602 is divided into plurality of sub-carriers 603. The center frequencies of the sub-carriers 603 are numbered by 1 to 8 along the frequency axis 602.

The time period illustrated along the time axis 601 is divided into time slots 604 numbered from 0 to 12 along the time axis 601. In this example, it is assumed that there are two mobile communication devices 103 denoted as UE1 and UE2. One or more sub-carriers allocated in a time slot to a mobile communication device 103 form a box 608 which is labelled with 1 if the sub-carrier or sub-carriers is/are allocated to UE1 in the time slot or by 2 if the sub-carrier or subcarriers is/are allocated to UE2 in the time slot. The sub-carrier allocation is the sub-carrier allocation for uplink data transmission of the mobile communication devices UE1 and UE2.

As above, the pattern for frequency hopping is as it was explained with reference to FIG. 2, i.e. the numbers of sub-carriers allocated to UE 1 and UE2, respectively, decrease by one from time slot to time slot.

In this example, it is assumed that the network, e.g. the radio access network 102, transmits a first message 605, for example in time slot 0, to the mobile communication devices UE1 and UE2 with which it is signaled that for uplink data transmission, sub-carriers 5 to 8 are allocated to UE1 and sub-carrier 4 is allocated to UE2. It is further assumed that in the first message 605 or also possibly before the transmission of the first message 605 it is signaled to UE1 and UE2 to use frequency hopping and what frequency hopping pattern should be used, i.e. according to which frequency hopping rule sub-carriers used for uplink data transmission should be changed. In this example, it is assumed that the frequency hopping rule is the same as in the example described with reference to FIG. 2.

The first message 605 is for example broadcast or multicast to the mobile communication devices UE1 and UE2. Alternatively, the information about the allocation of sub-carrier groups to the mobile communication devices UE1 and UE2 may also be dedicatedly transmitted to the mobile communication devices. In the latter case, for example, two first messages 605 are transmitted. Analogously to the situation described with reference to FIG. 2 and FIG. 5, after time slot 5, frequency splitting is about to occur according to the frequency hopping pattern with respect to the sub-carrier set allocated to the mobile communication device UE1, just as it is the case in time slot 6 in the examples described with reference to FIG. 5 and FIG. 2. In this embodiment, however, the radio access network 102 detects that a frequency splitting is about to occur in the next time slot and signals to the mobile communication device UE1 what sub-carriers should be used for uplink data transmission by the mobile communication device UE1 in the next time slot.

For example, the radio access network 102 detects that in time slot 6, if the frequency hopping pattern was followed, frequency splitting would occur. Therefore, the radio access network 102 transmits a second message 606 in time slot 5 to the mobile communication device UE1 with which in this example, it is signaled to the mobile communication UE1 to use the sub-carriers 3 to 6 in time slot 6. This sub-carrier group is for example chosen by the radio access network 102 because it allows the mobile communication device UE1 to carry out the frequency hopping pattern following time slot 6 for a maximum number of time slots, namely until time slot number 8, without another frequency splitting situation.

According to the second message 602, the mobile communication device UE1 uses the sub-carrier group consisting of the sub-carriers 3 to 6 in time slot 6 for uplink data transmission. In time slot 7 and 8 the mobile communication device UE1 uses the sub-carrier groups as specified by the frequency hopping pattern. In time slot 8, there is again the situation that in the next time slot, if the frequency hopping pattern was followed, frequency splitting would occur. Therefore, the radio access network sends a third message 607 with which it is signaled to the mobile communication device UE1 to use the sub-carrier group including sub-carriers 5 to 8 in time slot 9. Accordingly, the mobile communication device UE1 selects sub-carriers 5 to 8 in time slot 9 for uplink data transmission and continues to follow the frequency hopping pattern in the following time slots. This method is also applicable to more complex frequency hopping patterns.

Summarizing, two possibilities according to two embodiments are described with references to FIG. 5 and FIG. 6 to avoid a frequency splitting as examples for the method described with reference to FIG. 3.

In the example described with reference to FIG. 5, when there is a frequency splitting and the frequency band allocated to the mobile communication device 103 is split into two parts, the smaller part of the frequency band, i.e. the part of the frequency band corresponding to a smaller range of frequencies, is not used. If the two parts of the same size, for example the part corresponding to lower frequencies is used by the mobile communication device 103 since the required transmission power for transmitting data with lower carrier frequencies is lower than for the data transmission with higher carrier frequencies. Alternatively, the part corresponding to higher frequencies is used. Whether to use the part corresponding to higher frequencies or to use the part corresponding to lower frequencies is for example known to the mobile communication device 103 when it is delivered to the user. In this case, no signaling from the radio access network 102 is necessary and it can be used for any frequency hopping pattern (frequency hopping sequence). It is well suited for communication connections which have low real time requirements, i.e. for which higher latencies and changes in the latency are allowed, for example for communication connections to the Internet.

Alternatively, as explained with reference to FIG. 6, the radio access network 102 signals to the mobile communication device 103 before the time slot, in which, if the frequency hopping pattern was followed, the frequency band allocated to the mobile communication device 103 would be split into two (or more) parts, which sub-carriers it should use for data transmission instead. This allows that the data rate for the communication between the mobile communication device 103 and the radio access network 102 may be constant since the number of sub-carriers allocated to the mobile communication device is not (necessarily) changed as it is when one of the parts in which the frequency band is split is not used. Therefore, this method is well suited for communication connections which have high real time requirements, for example for communication connections in which there are requirements with respect to the maximum latency, for example communication connections for the transmission of speech. This method is also applicable for each frequency hopping sequence.

In one embodiment, a hybrid method for the allocation of sub-carriers to the mobile communication device 103 is used. According to one embodiment, a mobile communication device in a radio cell may use sub-carriers for uplink data transmission according to frequency hopping while another mobile communication device in the radio cell uses sub-carriers semi-statically, i.e. sub-carriers are allocated to the mobile communication devices semi-statically. In this way, sub-carriers may be allocated to a mobile communication device 103 according to frequency hopping or semi-statically depending on which of these both possibilities is better suited for the current situation of the mobile communication device 103. If the mobile communication device 103 is for example located at a border of the radio cell, sub-carriers are allocated to the mobile communication device 103 according to frequency hopping to avoid inter cell interference. If the mobile communication device 103 is moving slowly those sub-carriers may be allocated to the mobile communication device 103 which correspond to a frequency band which has the best transmission characteristics for the mobile communication device 103, i.e. a channel dependent sub-carrier selection may be carried out.

The semi-statical allocation of sub-carriers to a mobile communication device 103 that is slow moving or stationary which have good transmission characteristics for this mobile communication device 103 is adequate since the transmission characteristics for the slow moving or stationary mobile communication device 103 only change slowly or not at all. Consequently, the good transmission characteristics can be used by the mobile communication device 103 during the whole time period for which the sub-carrier allocation is not changed.

Also in the case that the mobile communication device 103 is fast moving, a sub-carrier group may be allocated semi-statically to the mobile communication device 103 for avoiding errors due to wrong equalization coefficients as they may arise when sub-carriers are allocated to the mobile communication device 103 according to frequency hopping.

Accordingly, according to one embodiment of the invention, the following method is used for data transmission.

FIG. 7 shows a flow diagram 700 according to the embodiment of the invention.

The flow diagram 700 illustrates a method for data transmission according to one embodiment of the invention.

In 701, the movement speed and/or the location of the mobile communication device, for example the mobile communication device 103, is determined.

In 702, a frequency hopping mode of a plurality of frequency hopping modes to be used the data transmission to or from the mobile communication device is selected based on the movement speed and/or the location of the mobile communication device.

In 703, the data is transmitted using the selected frequency hopping mode.

The frequency hopping modes of the plurality of frequency hopping modes for example differ with respect to the frequency hopping patterns to be used. A frequency hopping mode may also mean that a sub-carrier is semi-statically allocated to the mobile communication device, i.e. that the sub-carrier group allocated to the mobile communication device does not change for a certain time period. Illustratively, this means that according to the frequency hopping mode, the frequency does not hop for the time period.

For example, according to first frequency hopping mode frequency hops are more frequent than according to the second frequency hopping mode. For example, the second frequency hopping mode is a semi-statical allocation of sub-carriers, i.e. a frequency hopping mode that is trivial in the sense that allocated frequency bands stay constant. Generally, it is defined by a frequency hopping mode when and how frequency bands used for data transmission have to be changed. For example, according to a frequency hopping mode after each time slot, the frequency bands used for data transmission are changed according to a certain pattern.

In one embodiment, if the movement speed lies under a first threshold or lies above a second threshold the second frequency hopping mode is selected. If the mobile communication device is located at the border of a radio cell the first frequency hopping mode may be selected.

In one embodiment, the method further includes receiving information about inter cell interference generated by the mobile communication device and selecting the first frequency hopping mode if the inter cell interference lies above a third threshold.

This means that it may be detected that the mobile communication device generates inter cell interference based on information provided by, for example, a base station operating a radio cell neighboring the one in which the mobile communication device is located.

For carrying out the method of the structures with reference to FIG. 7, the mobile communication system 100 is for example configured as is explained with reference to FIG. 8.

FIG. 8 shows a communication system 800 according to an embodiment of the invention.

The communication system 800 includes a determining circuit 801 configured to determined the movement speed and/or the location of a mobile communication device of the communication system 800.

In addition, the communication system 800 includes a selecting circuit 802 configured to select, based on the movement speed and/or the location of the mobile communication device a frequency hopping mode of a plurality of frequency hopping modes to be used for data transmission to or from the mobile communication device.

Further, the communication system 800 includes a transmitting circuit 803 configured to transmit data using the selected frequency hopping mode, for example to transmit data between the mobile communication device and a radio access network of the communication system 800.

For example, the determining circuit 801 and the selecting circuit 802 are located in a radio access network of the communication system 800 and it is signaled to a mobile communication device of the communication system 800 which frequency hopping mode has been selected. The mobile communication device includes the transmitting circuit and transmits data in accordance with the selected frequency hopping mode.

An example for the application of the method described with reference to FIG. 7 is described in the following. It is assumed in the following that the sub-carrier allocation concerns uplink data transmission according to LTE and that it is broadcast by the radio access network 102, for example by the base station 104 in the radio cell operated by the base station 104, which of the sub-carriers should be used for frequency hopping and which of the sub-carriers are semi-statically allocated for example to certain mobile communication devices in the radio cell or for shared channels. By this signaling, it can be avoided that collisions occur between the frequency hopping and the semi-statical allocation of sub-carriers, e.g. in the case that a mobile communication device starts to use a sub-carrier according to the frequency hopping pattern which is semi-statically allocated to another mobile communication device or to a shared channel.

The signaling is for example done in such a way that the sub-carriers are specified which are allocated semi-statically or the sub-carriers which are not allocated semi-statically are specified, depending on which number is lower. In this way, a low signaling effort can be achieved both in the case that a large amount of sub-carriers is semi-statically allocated or a low number of sub-carriers is semi-statically allocated.

Some sub-carriers may also be used permanently. For example, the uplink random access channel (RACH) of the radio access network 102 could be transmitted permanently on a fixed sub-carrier group or some sub-carriers are defined and reserved for the usage for the RACH. In one embodiment, all mobile communication devices are informed about such a permanent allocation, for example when they are delivered to the users such that no special signaling is necessary for this case.

In the following example for sub-carrier allocation some sub-carriers are permanently allocated, some sub-carriers are semi-statically allocated and for some sub-carriers frequency hopping is used, as explained in the following with reference to FIG. 9.

Figure 9:
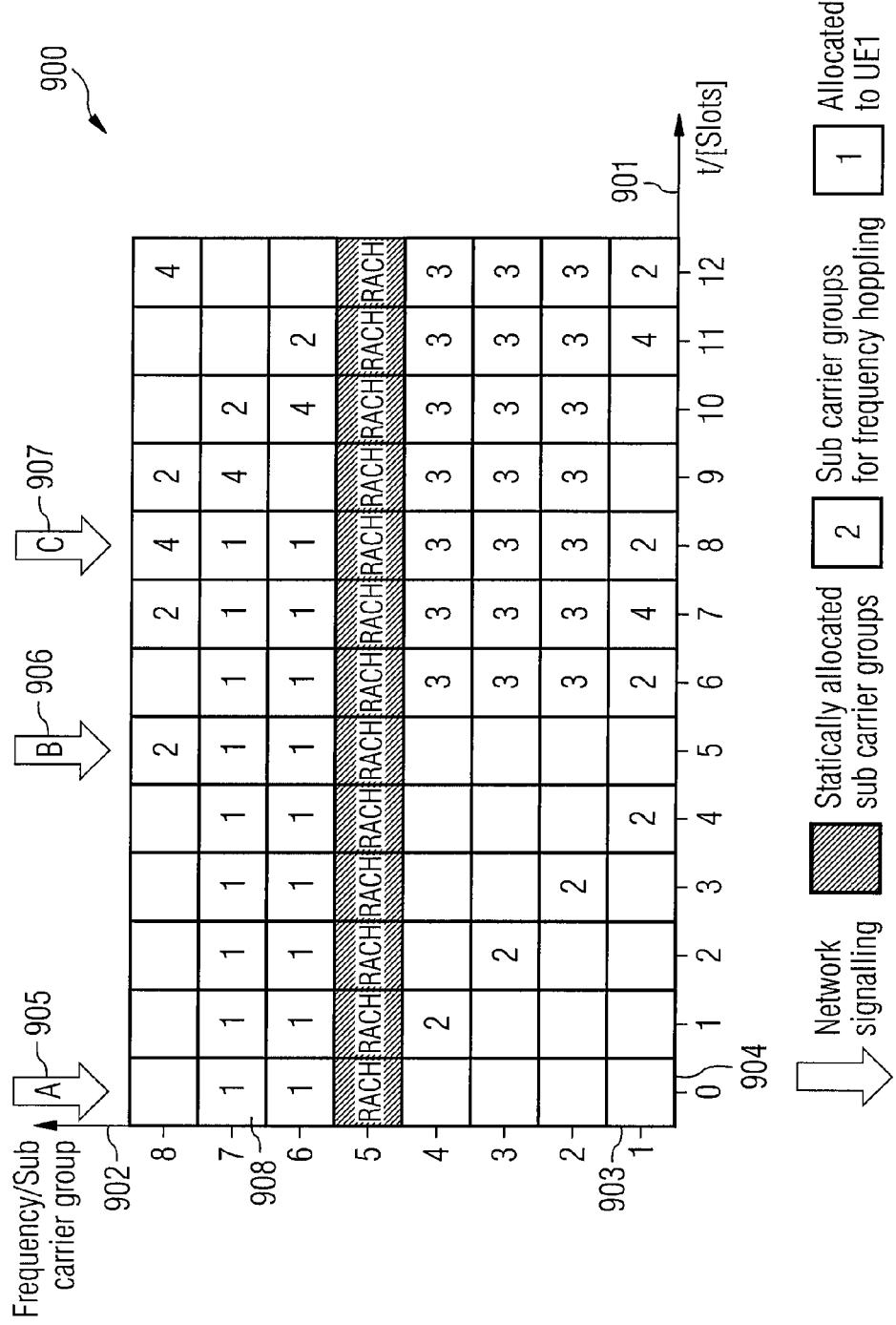
FIG. 9 shows a time frequency diagram according to an embodiment of the invention.

FIG. 9 shows a time frequency diagram 900 according to an embodiment of the invention.

Similarly to FIG. 6, time is illustrated into the right direction along a time axis 901 and frequency is illustrated into the upwards direction along a frequency axis 902. The frequency range illustrated along the frequency axis 902 is divided into plurality of sub-carriers 903. The center frequencies of the sub-carriers 903 are numbered by 1 to 8 along the frequency axis 902.

The time period illustrated along the time axis 901 is divided into time slots 904 numbered from 0 to 12 along the time axis 901. In this example, it is assumed that there are four mobile communication devices 103 denoted as UE1 and UE2. One or more sub-carriers allocated in a time slot to a mobile communication device 103 form a box 908 which is labelled with 1 if the sub-carrier or sub-carriers is/are allocated to UE1 in the time slot or by 2, 3, 4, or RACH if the sub-carrier or subcarriers is/are allocated to UE2, UE3, UE4, or the RACH respectively.

Sub-carrier number 5 is permanently assigned for usage for the RACH. This is for example known to each mobile communication device upon for delivery to the users. In time slot 0, the radio access network 102 sends a first message 905 for broadcast, multicast or dedicated to the mobile communication devices with which it is signaled that the sub-carrier groups 6 and 7 are semi-statically allocated.

It is assumed that the mobile communication device UE2 should use frequency hopping. This could for example be signaled to the mobile communication device UE2 by the first message 905 or could have been signaled to the mobile communication device UE2 earlier. Since it is signaled by the first message 905 that the sub-carriers 6 and 7 are semi-statically allocated and it is known to the mobile communication devices that the sub-carrier 5 is permanently allocated to the RACH, the mobile communication device UE2 and all other mobile communication devices in the radio cell know that the sub-carriers 1, 2, 3, 4, and 8 are available for frequency hopping.

It is assumed that as a starting sub-carrier for the frequency hopping pattern the sub-carrier 4 is allocated to the mobile communication device UE2 (this is for example signaled with the first message 905). The frequency hopping pattern to be used is assumed to be the same as in examples described with reference to FIGS. 2, 5, and 6. Accordingly, the mobile communication device UE2 selects the sub-carriers to be used for uplink data transmission such that the number of the sub-carrier decreases from time slot to time slot by 1. In this example, since it is assumed that data transmission by the mobile communication device UE2 starts in time slot number 1, the mobile communication device UE2 uses sub-carrier 4 in time slot 1, sub-carrier 3 in time slot 2, sub-carrier 2 in time slot 2 and sub-carrier 1 in time slot 4 and then, continuing at the other end of the frequency band sub-carrier 8 in time slot 5 since there is no sub-carrier with a lower number than 1.

It is assumed that starting with time slot number 6, the sub-carriers 2, 3, and 4 are to be allocated to UE3. Therefore, the radio access network 102 sends a second message 906, for example using broadcast to the mobile communication devices in the radio cell. For a minimal signaling afford and since more of the sub-carriers are semi-statically or permanently allocated than not, in the second message 906 it is specified that starting from time slot number 6, only sub-carriers 1 and 8 are available for frequency hopping. The mobile communication device UE2 selects the sub-carrier such that in the number of the sub-carrier is decreased by one from time slot 5 to time slot 6, wherein all sub-carriers which are not available for frequency hopping are left out. Consequently, the mobile communication device UE2 in time slot 6 uses sub-carrier number 1 since sub-carriers 2 to 7 are not available for frequency hopping.

In time slot 7, it is assumed that mobile communication device UE4 starts with uplink data transmission and is signaled by the radio access network 102 to use frequency hopping and to start the frequency hopping pattern with sub-carrier 1.

In time slot 9, the sub-carriers 6 and 7 are released, i.e. are no longer allocated to the mobile communication device UE1. Consequently, in time slot 8, the radio access network 102 sends a third message 907 to the mobile communication devices in the radio cell with which it is signaled, that in the following, i.e. starting with time slot number 9, sub-carriers 1, 6, 7, and 8 are available for frequency hopping. These sub-carriers now available for frequency hopping are taken into account by the mobile communication devices UE2 and UE4 in the following time slots starting with time slot 9.

The type of allocation is used for the mobile communication device 103, i.e. whether the mobile communication device should use frequency hopping or it should use a sub-carrier group that is fixed, is for example decided by the radio access network 102 according to the following criteria:

1) Based on the disturbances caused by the mobile communication device 103 in a radio cell neighboring the one in which the mobile communication device 103 is located (inter cell interference). If the disturbances by the mobile communication device 103 with respect to a certain sub-carrier group are too large, for example exceed a certain threshold, the mobile communication device 103 is instructed by the radio access network 102 to use a frequency hopping. Due to the frequent change of the sub-carriers used in accordance with frequency hopping inter cell interference with respect to a sub-carrier group is reduced. This relates to the case that the mobile communication device 103 is located at the border of the radio cell. The base station 104 can for example receive signaling data about interference in the neighboring radio cells such that it may determine which mobile radio device located in the radio cell operated by the base station 104 is causing inter cell interference. The reduction of inter cell interference by using frequency hopping can be improved if in neighboring radio cells, different frequency hopping patterns (frequency hopping sequences) are used. For this, for example, the frequency hopping sequence to be used in the radio cell is signaled using broadcast in each radio cell separately.

2) Based on the movement speed of the mobile communication device 103.

A high movement speed, for example higher than 100 km/h, may lead, if frequency hopping is used, to low transmission quality and a high bit error rate. Therefore, according to one embodiment of the invention, a sub-carrier group is allocated semi-statically to the mobile communication device 103 if it is has a high movement speed, for example higher than 100 km/h such that there is enough time for an estimation of the equalization coefficients.

If the mobile communication device 103 has a low movement speed or is stationary, for example is moving at a speed lower than 3 km/h, a sub-carrier group is in one embodiment semi-statically allocated to the mobile communication device 103, for example a sub-carrier group including those sub-carriers which allow the best transmission quality for the mobile communication device 103. In this way, an above-average transmission quality may be achieved for the mobile communication device 103.

3) If the mobile communication device 103 does not fulfill the criteria for semi-statical allocation, i.e., in this example, is not moving as an especially high speed or at an especially low speed, the radio access network 102 in one embodiment determines that the mobile communication device 103 should use frequency hopping. In other words, frequency hopping is used by default. In this way, since sub-carrier groups are only semi-statically allocated in certain cases, it can be achieved that the number of sub-carriers available for frequency hopping is high and inter cell interference is low.

In one embodiment, the mobile communication device 103 may, if it has a low movement speed, signal to the radio access network 102 that it desires a channel depending sub-carrier selection, i.e. requests that sub-carriers are semi-statically allocated to it based on the transmission characteristics of the sub-carriers for the mobile communication device 103. For example, the sub-carriers are semi-statically allocated to the mobile communication device 103 if it requests it and its speed is below a certain threshold.

From the point of view of the operator of the mobile communication system 100, the semi-statical allocation of sub-carriers is more valuable compared to frequency hopping since the benefit of frequency hopping is reduced if sub-carriers are allocated semi-statically.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for data transmission comprising:
   determining a set of frequency bands available for data transmission from a plurality of frequency bands;
   determining whether there is a frequency band of the plurality of frequency bands that lies between two frequency bands of the set of frequency bands and is not in the set of frequency bands;
   selecting, in case that there is a frequency band of the plurality of frequency bands that lies between two frequency bands of the set of frequency bands and is not in the set of frequency bands, another set of frequency bands from the plurality of frequency bands such that there is no frequency band of the plurality of frequency bands that lies between two frequency bands of the other set and is not in the other set; and
   transmitting the data using the other set of frequency bands.

2. The method according to claim 1, wherein the other set of frequency bands is a subset of the set of frequency bands.

3. The method according to claim 1, wherein the other set of frequency bands is a subset of the set of frequency bands for which there is no frequency band of the plurality of frequency bands that lies between two frequency bands of the subset and is not in a subset which corresponds to the largest frequency range among all subsets of the set of frequency bands for which there is no frequency band of the plurality of frequency bands that lies between two frequency bands of the respective subset and is not in the respective subset.

4. The method according to claim 2, wherein if there are a plurality of subsets of the set of frequency bands for which there is no frequency band of the plurality of frequency bands that lies between two frequency bands of the respective subset and is not in the respective subset which correspond to a larger frequency range than all other subsets of the set of frequency bands for which there is no frequency band of the plurality of frequency bands that lies between two frequency bands of the respective subset and is not in the respective subset, the subset of the plurality of subsets is selected which among the plurality of subsets includes the frequency bands corresponding to the lowest frequencies.

5. The method according to claim 1, further comprising generating a message specifying the other set and receiving the message.

6. The method according to claim 5, wherein the message is generated by a communication network of a communication system and is received by a communication terminal of the communication system, and the data is transmitted using the other set of frequency bands by the communication terminal.

7. The method according to claim 6, where the data is transmitted by the communication terminal to the communication network.

8. The method according to claim 1, wherein the set of frequency bands available for data transmission is the set of frequency bands that is to be allocated for data transmission according to an allocation scheme.

9. The method according to claim 8, wherein the allocation scheme is a frequency hopping scheme.

10. A communication system comprising:
a first determining circuit configured to determine a set of frequency bands available for data transmission from a plurality of frequency bands;
a second determining circuit configured to determine whether there is a frequency band of the plurality of frequency bands that lies between two frequency bands of the set of frequency bands and is not in the set of frequency bands;
a selecting circuit configured to select, in case that there is a frequency band of the plurality of frequency bands that lies between two frequency bands of the set of frequency bands and is not in the set of frequency bands, another set of frequency bands from the plurality of frequency bands such that there is no frequency band of the plurality of frequency bands that lies between two frequency bands of the other set and is not in the other set; and
a transmitting circuit, configured to transmit data using the other set of frequency bands.

11. The communication system according to claim 10, comprising a communication network and a communication device, wherein data is transmitted between the communication device and the communication network.

12. The communication system according to claim 11, wherein the first determining circuit, the second determining circuit, the selecting circuit, and the transmitting circuit are part of the communication device.

13. The communication system according to claim 12, wherein the selecting circuit is configured to select as the other set of frequency bands the subset of the set of frequency bands for which there is no frequency band of the plurality of frequency bands that lies between two frequency bands of the subset and is not in the subset which corresponds to the largest frequency range among all subsets of the set of frequency bands for which there is no frequency band of the plurality of frequency bands that lies between two frequency bands of the respective subset and is not in the respective subset.

14. The communication system according to claim 11, wherein the first determining circuit, the second determining circuit, and the selecting circuit are part of the communication network, and the transmitting circuit is part of the communication device.

15. The communication system according to claim 14, wherein the communication network further comprises a message generating circuit configured to generate a message specifying the other set, and the communication device further comprises a receiving unit configured to receive the message.

16. The communication system according to claim 10, wherein the set of frequency bands available for data transmission is the set of frequency bands that is to be allocated for data transmission according to an allocation scheme.

17. The communication system according to claim 11, wherein the allocation scheme is a frequency hopping scheme.

18. A communication system comprising:
a first determining means for determining a set of frequency bands available for data transmission from a plurality of frequency bands;
a second determining means for determining whether there is a frequency band of the plurality of frequency bands that lies between two frequency bands of the set of frequency bands and is not in the set of frequency bands;
a selecting means for selecting, in case that there is a frequency band of the plurality of frequency bands that lies between two frequency bands of the set of frequency bands and is not in the set of frequency bands, another set of frequency bands from the plurality of frequency bands such that there is no frequency band of the plurality of frequency bands that lies between two frequency bands of the other set and is not in the other set; and
a transmitting means for transmitting data using the other set of frequency bands.

* * * * *